May 9, 1939.  H. R. MINOR  2,157,243

METHOD OF MAKING SOFT SPONGE

Filed April 15, 1937  2 Sheets-Sheet 1

INVENTOR
HENRY R. MINOR
BY
ATTORNEYS

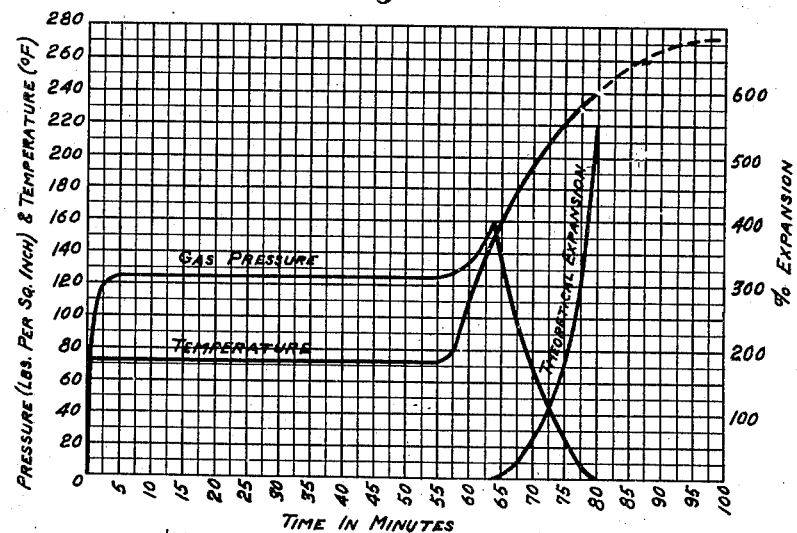
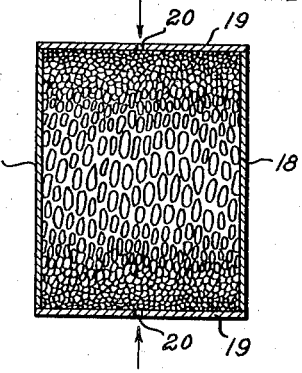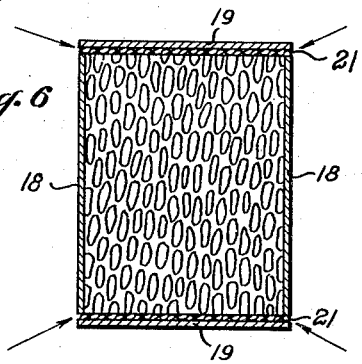
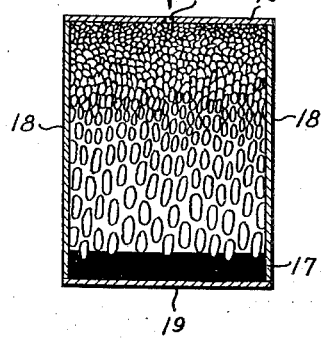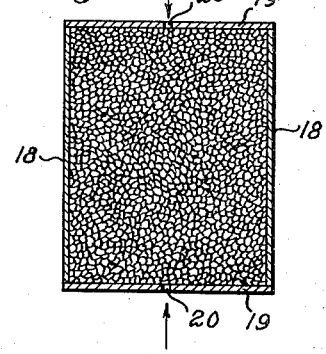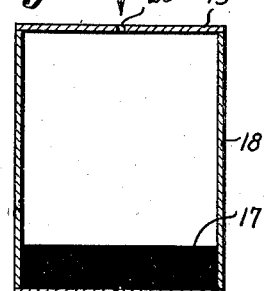

Patented May 9, 1939

2,157,243

UNITED STATES PATENT OFFICE 2,157,243

METHOD OF MAKING SOFT SPONGE

Henry R. Minor, Dayton, Ohio, assignor to Industrial Process Corporation, Dayton, Ohio, a corporation of New York Application April 15, 1937, Serial No. 137,129

13 Claims. (Cl. 18—53)

My invention relates to a method of manufacturing sponge rubber.

It is the particular object of my invention to provide a method of manufacturing sponge rubber so as to control the nature of the sponge, the character of the openings in the rubber forming the sponge and the resulting appearance of the sponge, as well as its physical and structural characteristics.

It is my object to provide a method in which there is the step (a) of impregnating the raw rubber stock at approximately room temperature under relatively low gas pressure; (b) raising the heat applied to the rubber without causing expansion other than the expansion of the gas cells in the rubber, and continuing this heat until the rubber is softened; and (c) releasing the gas at a rate which has such a relationship to the increase in heat being transmitted to the rubber that the rate of impregnation and the rate of heating have approximately the same or a close relationship. During this last step, the rubber must not be softened to a point where it will collapse in the mold, and it must not be heated so that it will vulcanize and become too hard to prevent the expansion of the gas and the release thereof, as such release must be completed before or shortly after the final rubber set takes place, preliminary to final vulcanization.

It is my object in step (b) to increase the gas pressure and the temperature substantially in parallel during this second stage and during the third stage to have the temperature increase and the pressure decrease during which last stage the major expansion takes place to produce the sponge characteristics of the rubber.

Referring to the drawings in detail:

Figure 4 is a similar diagram showing the method employed for producing the sponge in Figure 8.

Figure 5 is a diagrammatical view of a mold in section, of the completed sponge rubber where the gas is allowed to escape from either side of the mold so that the finer sponge is at the top, bottom and either side of the mold and the coarser sponge having elongated cells with more rubber between the cells is at the center of the body of the rubber.

Figure 6 is a view showing the cells elongated throughout the body of the sponge and with the mold in section showing the fabric at either end of the mold for permitting the expansion of the gas.

Figure 7 shows a sample of sponge diagrammatically illustrated in section where the gas is permitted to escape at the top only.

Figure 8 is a diagrammatic view of the sponge of the pin point type where the escape of the gas has been allowed to extend to the point where the sponging is uniform in the body of the rubber.

Figure 9 is a diagram showing the mold of a section with a thin layer of rubber with one sixth (⅙) of the capacity of the mold prior to impregnation and vulcanization.

The method of my application herein depends upon the preliminary impregnation of the rubber in the raw rubber stock stage. The impregnation takes place with carbon dioxide gas at some constant temperature below 140° F. and with low gas pressure, ranging from 100 to 170 pounds. By employing temperatures as low as room temperature, and such low pressures, it is possible to thoroughly impregnate the rubber with a minimum waste of gas, with no appreciable cost for steam and to so prepare the rubber that the remainder of the process is quickly and effectively employed with a minimum period of time. In all stages of the process, by using low temperatures and low pressures, it is possible to use very economical apparatus for this purpose. Mere sheet metal molds can be utilized within the impregnator and vulcanizer.

The method consists of the following essential steps:

(a) Impregnating the rubber with carbon dioxide gas at constant temperature below 140 degrees F. and with gas pressures ranging from 100 pounds to 170 pounds.

(b) Then turning on steam to raise the heat of the rubber without causing an expansion other than the expansion of the gas cells in the rubber, and continuing until the rubber is softened.

(c) Release the gas at a rate which will have the close relationship to the heat being transmitted to the rubber that is, the rate of release and the rate of heat absorption have a close relationship. The heat applied must not be so great as to cause the rubber to set up prior to the completion of the release. Otherwise complete expansion will not be secured. The converse of that would be that if the heat supplied is too little, during the release, then, the gas would boil out of the rubber, because the stock was not ready to take a set for a considerable interval of time. The release of the gas must be completed before or shortly after the rubber takes its final set of vulcanization.

Figure 2:
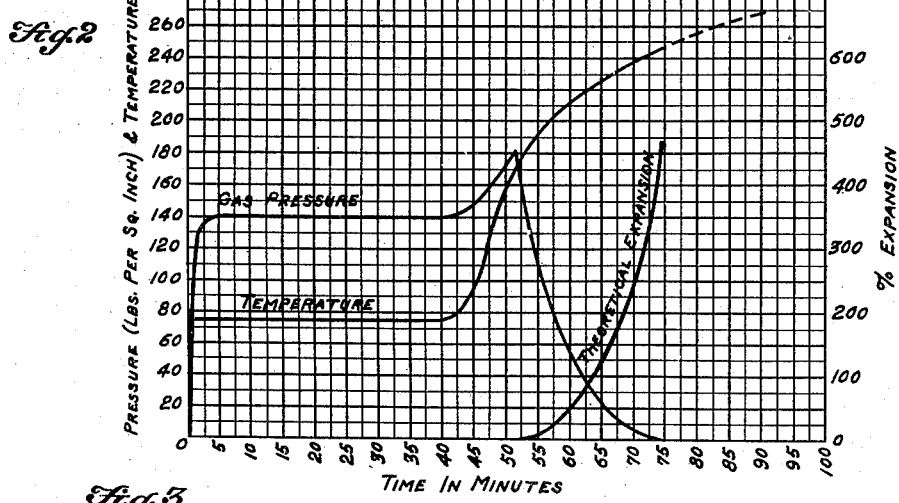
Figure 2 is a chart showing the relation between temperature, gas pressure and time for producing a rubber sponge, such as is diagrammatically illustrated in Figure 5.
Figure 3:
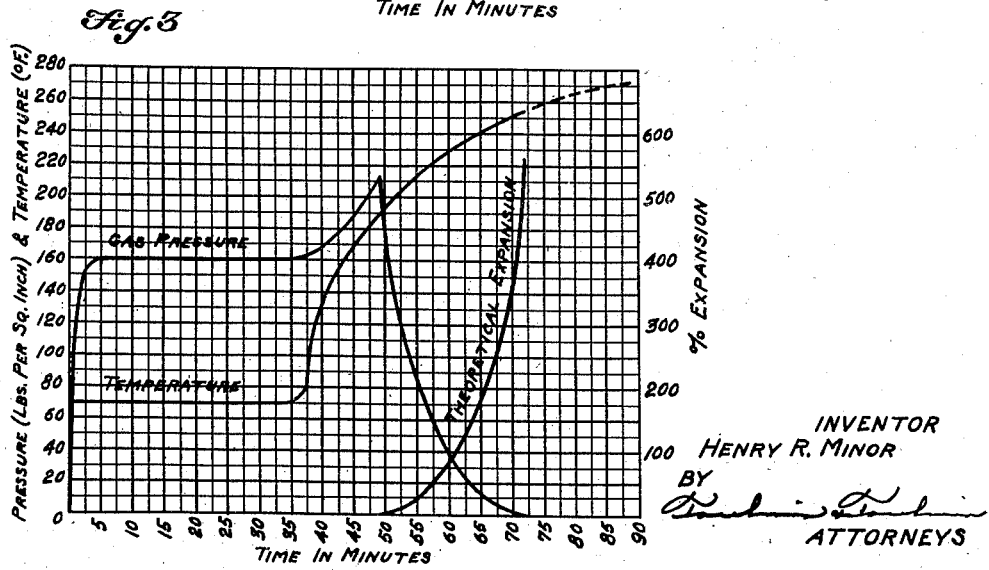
Figure 3 is a similar diagram showing the method employed for producing the sponge shown diagrammatically in Figure 6.

It will be noted from the foregoing and from Figures 2, 3 and 4, that the temperature and gas pressure run along substantially constant for an appreciable period in parallel relationship to one another. At the end of the first step, and during the second step, the pressure and temperature rise together sharply. It will be noted that for the third step, the pressure drops off sharply while the temperature continues its climb. In order to control the sponging, to get the particular texture desired and the different kinds of textures, the escape of the gas is regulated and the temperature is regulated. The arrangement of the molds, as indicated in Figures 5 to 8, plays an important part in the regulation of the size of the openings in the sponge, and their location in the resulting body of the sponge rubber.

Figure 1:
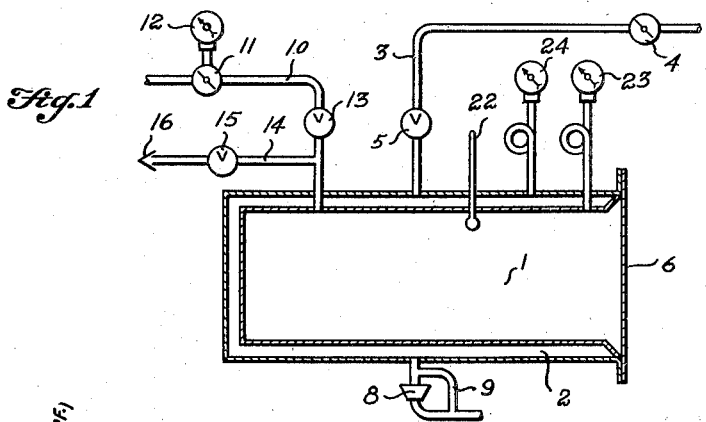
Figure 1 is a diagrammatic view of the mechanism used for impregnating the rubber and heating the rubber. It is understood that the rubber is placed in molds, which are diagrammatically illustrated in Figures 5 to 9, inclusive.

Referring to Figure 1, it represents an autoclave, which may be of any suitable size. It is commonly designed for pressures between 150 and 300 pounds per square inch. It is provided with a steam jacket 2 which is supplied with steam through the steam line 3 and regulator 4. The line is controlled by the valve 5. The autoclave may be heated in any desired manner in addition to a steam jacket, as by the use of internal heating coils. The autoclave is closed by a door 6.

A condensation trap 8 is provided with a by-pass 9.

Carbon dioxide gas is supplied through the pipe 10 and regulator 11 which has a gauge 12. The line 10 is controlled by the valve 13. A release line 14 is controlled by the valve 15. The gas makes its exit through the nozzle 16. The rubber compound, consisting of the raw rubber stock designated 17, is placed within the sheet metal mold having the sides 18 and top and bottom 19. The top 19 may have a single perforation 20 or it may be solid and rest upon a layer of fabric 21. The bottom may have a bottom opening 20 as in Figures 5 and 9, or be solid as in Figures 6 and 7. After the rubber has been placed in the mold, the mold is put within the autoclave and the door closed. The valve 13 is opened and the carbon dioxide gas is allowed to enter until it reaches the desired pressure, which is preferably a maximum of 140 pounds. The pressure is then kept constantly low. The regulator 11 or the valve 13 is merely shut off and the compound is allowed to remain under this gas pressure for an interval of time sufficient to impregnate the rubber. This depends upon the texture of the compound. The usual time is from 10 minutes to one and one-half hours. If it is desired to increase the temperature, then the valve 5 is opened. Steam may then be admitted at such a desired pressure as, for example, 40 pounds. A relatively small amount of heat is sufficient to soften the rubber. The temperature is indicated upon the thermometer 22. The gas pressure is indicated upon the gauge 23 and the steam pressure upon the gauge 24.

When it is desired to release the gas, this is done by opening the valve 15, allowing the gas to discharge to any desired container through the nozzle 16. A common practice followed by me is to discharge this gas at an interval of 20 to 30 minutes. When the release has been completed, the interior of the heater will be approaching the temperature corresponding to the steam pressure applied in the outer jacket but not enough heat will have been supplied to cause the compound of rubber to set up or vulcanize.

The cure of the rubber is now continued until the rubber compound is vulcanized.

At 40 pounds steam pressure, satisfactory cures may be obtained from 40 to 120 minutes, depending upon the thickness and the acceleration used in the rubber compound.

It will be understood that measures may be employed for the circulation of the carbon dioxide gas and the recovery of the gas for re-use.

Referring to Figure 5, the gas is applied to both sides, but for only a part of the time required to fully impregnate the rubber. This will be seen indicated in the time of impregnation in the chart in Figure 2.

In Figure 6, the uniform, relatively large, vertically extending cells are caused by the use of temperatures high enough to cause the stock to take a slight set at or just prior to the release of the gas pressure. This will be noted from the chart in Figure 3 near the middle of the chart.

Referring to Figure 8, the uniform, substantially circular, small cells result from completing a release of the gas before enough heat is added to cause the stock to take a set, as will be noted from the chart in Figure 4. The reason is that the heat is not added in sufficient amounts to expand the gas too rapidly with the result that a uniform sponge is produced. In other words, I vary the texture by the controlling of the time of impregnation and by controlling the temperature immediately after the step of impregnation. The particularly novel step in the process is the utilization of a low temperature and low pressure period of impregnation as indicated by the horizontal, substantially parallel lines in Figures 2, 3 and 4 on the left side of the charts. It will be understood that where impregnation is effected at room temperature, production may be facilitated, which is one of the advantages of this method of placing the molds with the rubber in them in gas containers, which can be of cheap construction by reason of the low pressures employed, and then removing the impregnated rubber and placing it in a heated container, such as the autoclave shown in Figure 1. This reduces the investment in autoclaves and makes it possible to produce sponge rubber in large quantities at a low cost and with the simplest type of machinery.

I have found that carbon dioxide gas differs from other inert gases in various particulars. It has an affinity for rubber, and has the ability to rapidly enter the impregnated rubber. It can do so, I have discovered, at relatively low pressures, that is, the pressures generally ranging between 100 to 170 pounds per square inch, and this impregnation can take place at temperatures heretofore considered useless, namely, at room temperature, and at about approximately 140° F. as a maximum.

I have further found that this impregnation and later expansion of the gas is facilitated by the fact that due to the presence of some air in either the autoclave or in the impregnating chamber, moisture is present. This is one of the reasons for the advantage of carbon dioxide gas over inert gas such as nitrogen, as carbonic acid is present, according to the formula $$(CO_2 + H_2O = H_2CO_3)$$

again nitrogen does not have this affinity for rubber, and to get any results at all, must be employed at high pressures and high temperatures. As soon as you have high pressures, you have expensive machinery necessary to handle high pressures, and such machinery requires time and great care in its operation. When you use high temperatures, you immediately enter the zone of great expense for manufacturing, not only for the steam employed, but by reason of the necessary delays in operating the apparatus under such conditions.

Of course, the gauge of the stock, the exact pressure, temperature, nature of accelerators and other compounds of the stock will vary the specific temperatures and pressures, but the principles taught by this application disclosing my invention remain the same.

I have found that there are three important steps in my process:

(a) The step of preliminary impregnation at low pressures and temperatures with the pressure and temperatures remaining constant for a substantial period:

(b) The step during a relatively limited period of a substantially parallel increase in pressure and in temperature, the increase of the latter being more marked; and (c) The step during a relatively limited period of a sharp decrease and an abrupt decrease in gas pressure accompanied by continuing increase in temperature so adjusted that these two factors result in the desired expansion of the rubber due to the release of the gas and the increase of temperature to effect the setting of the rubber before or shortly after the release is completed, of the gas. These factors must be so adjusted that the temperature will not be so high as to cause rubber collapse, and the rubber must not become too hard to prevent the ordinary release of the gas to bring about the desired sponging.

It will be understood that I desire to comprehend within my invention and the claims covering it such modifications as may be necessary to adapt it to various conditions of use without departing from the intent and spirit of my invention.

Having thus fully described my invention, what I claim as new and desire to secure by Letters Patent, is:

1. In a method of making sponge rubber, the step of (a) subjecting the rubber to a gas pressure at substantially constant room temperature until impregnated; (b) a step of elevating the gas pressure and the temperature; (c) the step of decreasing the gas pressure while continuing the temperature; (d) and the step, after a release of sufficient gas to cause the desired sponging, of continuing the temperature to vulcanize the rubber in its sponged condition.

2. In a method of manufacturing sponge rubber, the step of (a) subjecting raw rubber stock to gas pressures ranging between 100 to 170 pounds per square inch, approximately, at substantially constant room temperature; (b) the step, after impregnation of the stock by the gas, of elevating the temperature and the pressure; (c) the step of decreasing the gas pressure while continuing the temperature; and (d) the step, after a release of sufficient gas to cause the desired sponging, of continuing the temperature to vulcanize the rubber in its sponged condition.

3. In a method of manufacturing sponge rubber, the step (a) of subjecting raw rubber stock to carbon dioxide gas under pressure ranging from approximately 100 to 170 pounds per square inch at a temperature ranging up to approximately 140° F. for a period sufficient to impregnate said rubber with the carbon dioxide gas, said temperature being sufficient to soften the rubber to facilitate said impregnation; (b) the step of elevating the temperature and gas pressure together; (c) the step of abruptly decreasing the gas pressure by releasing the gas to cause the gas to expand in the rubber to sponge the rubber, and (d) continuing the heating of the rubber at an increasing degree whereby the vulcanization of the rubber will take place substantially coincident with the accomplishment of the release of the gas as desired.

4. In a method of manufacturing sponge rubber, the step (a) of subjecting the raw rubber stock to gas impregnation at relatively low gas pressure at constant temperature, said pressure ranging approximately from 100 to 170 pounds per square inch; (b) the step of increasing the temperature and the pressure for a relatively short period to soften the raw rubber stock to accelerate the impregnation thereof; and (c) the step of abruptly reducing the pressure to cause the sponging of the stock and the increasing of the temperature to such a degree as not to cause the stock to collapse by reason of being too soft, but sufficient to cause the curing of the stock so that ultimate vulcanization will take place substantially coincident with the final release of the gas from the stock and the completing of the sponging operation whereupon by continued heating the vulcanization of the sponge is effected.

5. In a method of manufacturing sponge rubber, the step (a) of impregnating raw rubber stock at a constant temperature below 140° F. and at constant gas pressure ranging from 100 to 170 pounds per square inch with carbon dioxide gas; the step (b) of applying sufficient heat to raise the temperature without causing an expansion of the gas cells in the rubber other than the expansion of the gas to increase the heat, and continuing such heat until the rubber is softened; and the step (c) of continuing the heat at an increasing degree and of releasing the gas, such heat increase and gas pressure decrease being at a substantial comparable rate, so that the gas will be substantially released by the time the heat has hardened the rubber, the rubber is then in a state of substantial vulcanization, whereby with continued heating vulcanized rubber sponge is produced.

6. In a method of manufacturing sponge rubber, placing raw rubber stock in a mold having vent means, said stock occupying a fraction of the total size of the mold; placing said mold and stock in an autoclave; maintaining a substantial constant temperature and gas pressure for a period sufficient to impregnate the stock in the mold; raising the temperature in the autoclave to slightly soften the rubber and simultaneously increasing the gas pressure; releasing the gas pressure and increasing the temperature so that the rubber will be sponged by the time it is finally vulcanized, due to the increase in temperature and the mold be filled with sponge rubber.

7. In a method of manufacturing sponge rubber, placing raw rubber stock in a mold to fill a fractional portion thereof, regulating gas access and egress from said mold, subjecting the mold and the raw rubber stock therein to gas to impregnate the stock; heating the stock and mold to slightly soften the stock and simultaneously increasing the gas pressure; continuing the increase of heat and releasing the gas pressure to prevent the gas from escaping from the raw rubber stock and the mold so as to cause the rubber to expand in sponge condition to fill the mold, and adjusting the heat to bring the expanded rubber sponge to a vulcanized condition.

8. In a method of manufacturing sponge rubber, placing raw rubber stock in a mold to fill a fractional portion thereof, regulating gas access and egress from said mold, subjecting the mold and the raw rubber stock therein to gas to impregnate the stock; heating the stock and mold to soften the stock and simultaneously increasing the gas pressure; continuing the increase of heat and releasing the gas pressure to prevent the gas from escaping from the raw rubber stock and the mold so as to cause the rubber to expand in sponge condition to fill the mold, adjusting the heat to bring the expanded rubber sponge to a vulcanized condition, and during the foregoing process controlling the time of impregnation and temperature immediately after the step of impregnation so as to affect the size and shape of the holes formed in the sponge and the location thereof in the resulting vulcanized sponge.

9. In a method of producing sponge rubber of controlled texture, placing raw rubber stock within a mold of the size and configuration of the ultimate sponge desired, and subjecting one side of the rubber stock to impregnating gas at approximately room temperature for a sufficient time, less than that required to permeate the entire rubber stock, and then increasing the temperature and pressure of the impregnating gas to soften the rubber mass, and immediately thereafter simultaneously releasing the gas pressure while increasing the temperature to vulcanize the rubber and at the same time effect a sponging of the rubber to produce a product having a structure graduating from a complete sponge-like mass to a semi-solid and solid mass.

10. In a method of forming rubber sponge of relatively small, uniform, substantially circular cells therein, impregnating the stock with carbon dioxide gas at a constant pressure and constant temperature until the desired impregnation of the rubber stock has been reached, and thereafter increasing the temperature and gas pressure to further soften the rubber mass, then releasing the gas pressure while further increasing the temperature to vulcanize the rubber; the complete release of the gas being effected before the temperature of the stock has reached a point where the stock takes a set.

11. In a method of producing sponge rubber, placing a batch of raw rubber stock in a mold which has a vent means on the ends of said mold, subjecting said rubber stock to gas to impregnate it while maintaining the temperature and pressure substantially constant, said temperature approximating room temperature during impregnation, subjecting the rubber stock in the mold to higher temperatures to further soften it, thereafter simultaneously lowering the gas pressure while increasing the temperature, and releasing the gas from the impregnated stock at either end thereof just prior to raising the temperature of the rubber stock to the point at which vulcanization of said rubber takes effect.

12. A method of manufacturing sponge rubber having extended elongated cells therein, comprising the steps of impregnating rubber stock with inert gas, heating said stock high enough to cause the rubber to take a slight set while simultaneously increasing the pressure, thereafter releasing the gas pressure allowing sufficient gas to escape from the stock to effectively sponge the rubber producing elongated cells, and continuing the increase of temperature to vulcanize the rubber stock in this condition.

13. A method of producing sponge rubber, comprising the steps of subjecting rubber stock to gas pressure at a constant temperature and constant pressure to impregnate certain sections of the rubber stock with the gas for a time less than that required to completely impregnate the said stock, increasing the temperature and gas pressure simultaneously, and thereafter releasing the gas therefrom and increasing the temperature of said rubber stock to produce a section having a semi-solid structure and an adjacent section of completely sponged structure.

HENRY R. MINOR.